United States Patent
Long et al.

(10) Patent No.: US 9,960,447 B2
(45) Date of Patent: May 1, 2018

(54) POLYMER NETWORK SINGLE ION CONDUCTORS

(71) Applicant: THE REGENTS OF THE UNIVERSITY OF CALIFORNIA, Oakland, CA (US)

(72) Inventors: Jeffrey R. Long, Oakland, CA (US); Jeffrey Van Humbeck, Watertown, MA (US); Rob P. Ameloot, Diepenbeek (BE)

(73) Assignee: The Regents of the University of California, Oakland, CA (US)

( * ) Notice: Subject to any disclaimer, the term of this patent is extended or adjusted under 35 U.S.C. 154(b) by 150 days.

(21) Appl. No.: 15/102,851

(22) PCT Filed: Dec. 8, 2014

(86) PCT No.: PCT/US2014/069017
§ 371 (c)(1),
(2) Date: Jun. 8, 2016

(87) PCT Pub. No.: WO2015/085290
PCT Pub. Date: Jun. 11, 2015

(65) Prior Publication Data
US 2016/0315348 A1    Oct. 27, 2016

Related U.S. Application Data

(60) Provisional application No. 61/913,326, filed on Dec. 8, 2013.

(51) Int. Cl.
| | |
|---|---|
| *H01M 10/05* | (2010.01) |
| *H01B 1/12* | (2006.01) |
| *H01M 10/0565* | (2010.01) |
| *H01M 10/052* | (2010.01) |
| *H01M 10/0525* | (2010.01) |

(52) U.S. Cl.
CPC ..... *H01M 10/0565* (2013.01); *H01M 10/052* (2013.01); *H01M 10/0525* (2013.01); *H01B 1/122* (2013.01); *H01M 2300/0082* (2013.01)

(58) Field of Classification Search
CPC ........... H01M 10/0565; H01M 10/052; H01M 10/0525; H01M 2300/0082; H01B 1/122

USPC ......................................................... 521/25
See application file for complete search history.

(56) References Cited

PUBLICATIONS

Zhang et al. "A class of sp3 boron-based single-ion polymeric electrolytes for lithium ion batteries", RSC Advances, vol. 3, pp. 14934-14937 (Jul. 2, 2013).*
Reiter et al. "Ion-conducting lithium bis(oxalato)borate-based polymer electrolytes", Journal of Power Sources, vol. 189, pp. 133-138 (2009).*
Zhang et al. "Ion conductive characteristics of cross-linked network polysiloxane-based solid polymer electrolytes", Solid State Ionics, vol. 170, pp. 233-238 (2004).*
Watanabe et al. "Single ion conduction in polyether electrolytes alloyed with lithium salt of a perfluormated polyimide", Electrochimica Acta, vol. 45, pp. 1187-1192 (2000).*
Kim, Seung Beom, International Search Report and Written Opinion, PCT/US2014/069017, Korean International Property Office, dated Mar. 11, 2015.
Moussaid, El Mostafa, International Preliminary Report on Patentability and Written Opinion, PCT/US2014/069017, The International Bureau of WIPO, dated Jun. 23, 2016.
Reiter, Jakub et al. "Ion-conducting lithium bis(oxalato)borate-based polymer electrolytes," Journal of Power Sources, vol. 189, pp. 133-138 (2009).
Watanabe Masayoshi et al., "Single ion conduction in polyether electrolytes alloyed with lithium salt of a perfluorinated polyimide," Electrochimica Acta, vol. 45, pp. 1187-1192 (2000).
Zhang, Yunfeng et al., "A class of sp3 boron-based single-ion polymeric electrolytes for lithium ion batteries," RSC Advances, vol. 3, pp. 14934-14937 (Jul. 2, 2013).
Zhang, Zhengcheng et., "Cross-linked network polymer electrolytes based on a polysiloxane backbone with oligo (oxyethylene) side chains: synthesis and conductivity," Macromolecules, vol. 36, pp. 9176-9180 (2003).
Zhang, Z. C. et al., "Ion conductive characteristics of cross-linked network polysiloxane-based solid polymer electrolytes" Solid State Ionics, vol. 170, pp. 233-238 (2004).

* cited by examiner

*Primary Examiner* — Michael M Bernshteyn
(74) *Attorney, Agent, or Firm* — Gavrilovich, Dodd & Lindsey LLP

(57) ABSTRACT

The disclosure provides for polymer networks that can effectively conduct single ion electrolytes.

17 Claims, 10 Drawing Sheets

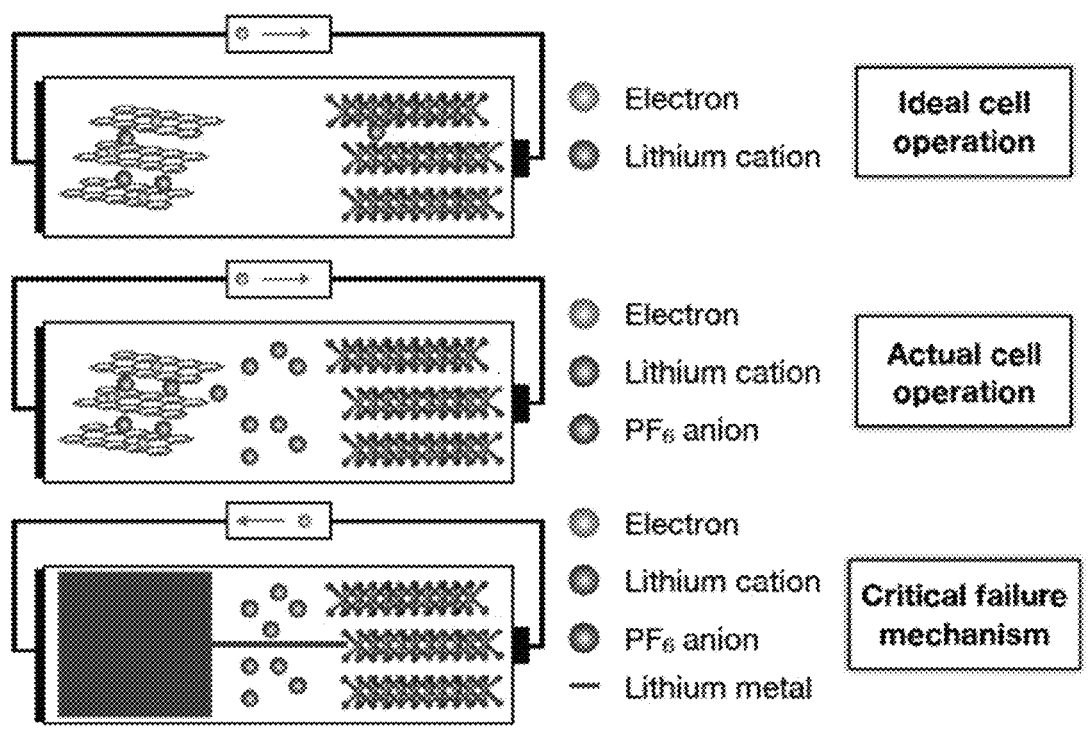
FIGURE 1
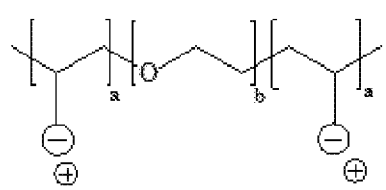
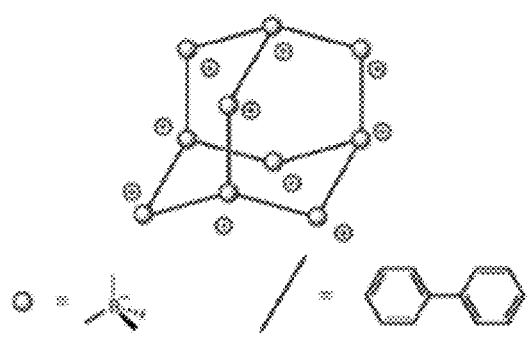
FIGURE 2A-B

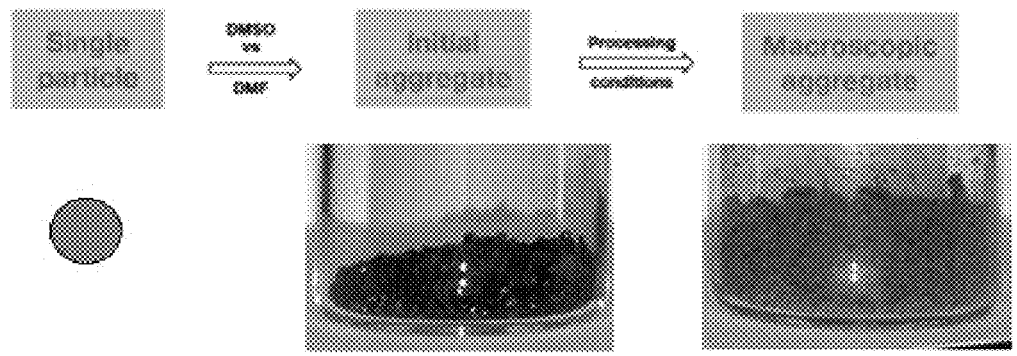
FIGURE 5
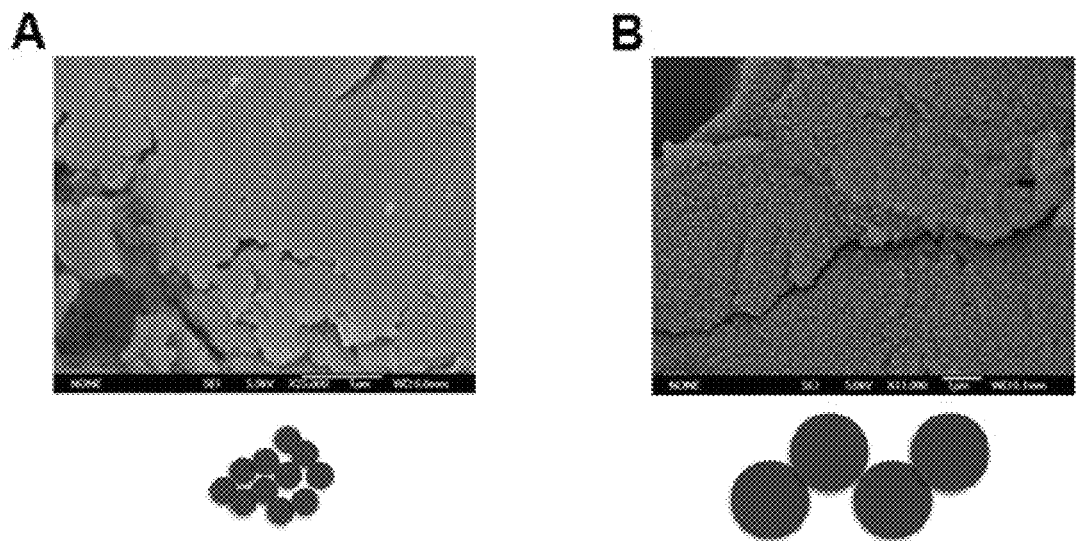
FIGURE 6A-B

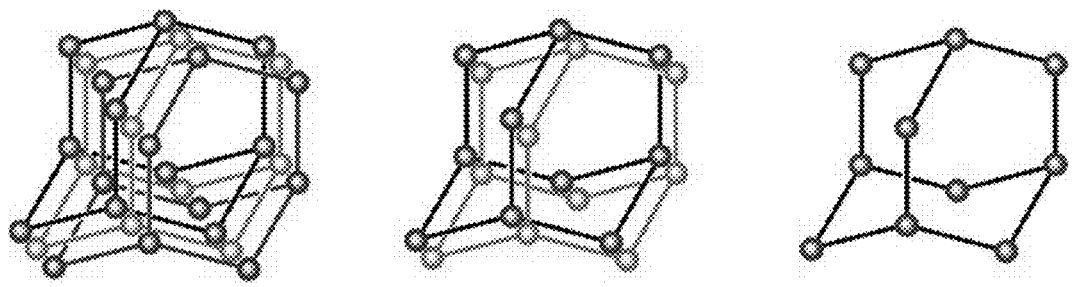
FIGURE 7
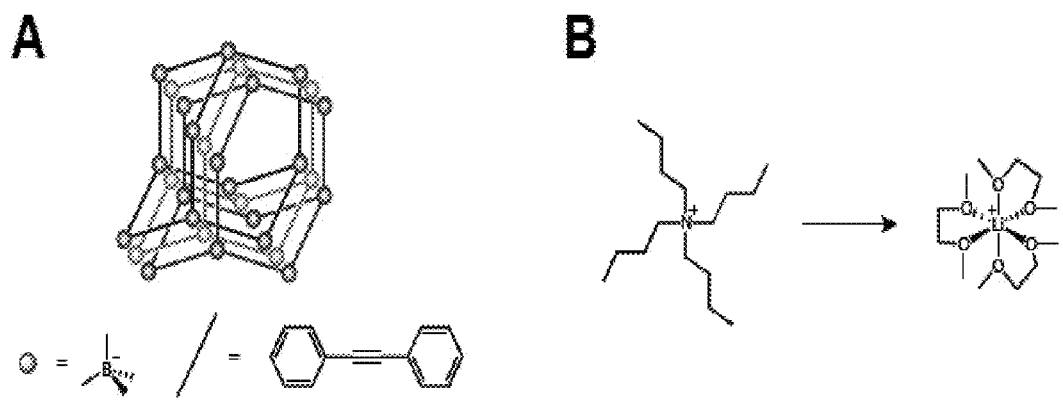
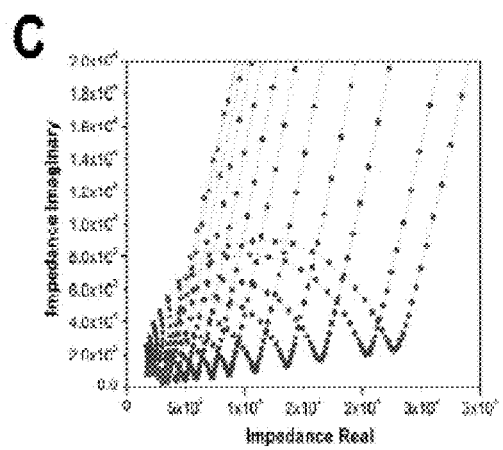
FIGURE 8A-C

POLYMER NETWORK SINGLE ION CONDUCTORS

CROSS REFERENCE TO RELATED APPLICATIONS

This application is a U.S. National Stage Application filed under 35 U.S.C. § 371 and claims priority to International Application No. PCT/US2014/069017, filed Dec. 8, 2014, which application claims priority under 35 U.S.C. § 119 from Provisional Application Ser. No. 61/913,326, filed Dec. 8, 2013, the disclosures of which are incorporated herein by reference.

STATEMENT REGARDING FEDERAL SPONSORED RESEARCH

This invention was made pursuant to Awards No. DE-AC02-05CH11231 and DE-SC000105 by the U.S. Department of Energy. The government has certain rights in the invention.

TECHNICAL FIELD

The disclosure provides for polymer networks that can effectively conduct single ion electrolytes.

BACKGROUND

Lithium-ion batteries have become a ubiquitous technology for personal electronics and electric/hybrid vehicles. Commercially available lithium ion batteries rely on simple lithium salts dissolved in high dielectric organic solvent mixtures, usually based on carbonates and/or glymes. Next generation batteries, however, require improved electrolytes. An ideal electrolyte would allow for the free movement of lithium cations but have immobilized anions, and would prevent short circuiting due to lithium dendrite formation.

SUMMARY

Provided herein are novel and innovative polymer networks which comprise one or more substituted arylborate cores that conduct ions in an efficient manner. The three-dimensional connectivity of the polymer networks disclosed herein provide added strength and rigidity, and further prevent the penetration of the polymers by lithium dendrites. Moreover, network polymers substituted with fluorine atoms provide additional stability by decreasing the polymer networks reactivity and flammability. The polymer networks of the disclosure can be used in a variety of applications and devices, including batteries (e.g., lithium ion batteries), nuclear separations, and environmental remediation.

The disclosure provides a conductive three dimensional (3D) polymer network comprising one or more cores having a structure of Formula I:

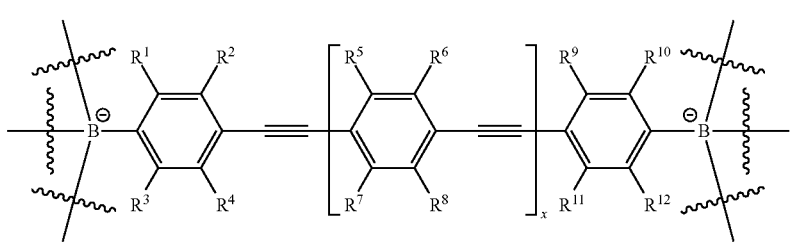

(Formula I)

wherein, $R^1$-$R^{12}$ are independently selected from the group comprising H, D, optionally substituted FG, optionally substituted alkyl, optionally substituted heteroalkyl, optionally substituted alkenyl, optionally substituted heteroalkenyl, optionally substituted alkynyl, optionally substituted heteroalkynyl, optionally substituted cycloalkyl, optionally substituted cycloalkenyl, optionally substituted aryl, optionally substituted heterocycle, optionally substituted mixed ring system, wherein one or more adjacent R groups can be linked together to form one or more substituted rings selected from the group comprising cycloalkyl, cycloalkenyl, heterocycle, aryl, and mixed ring system; and X is an integer from 0 to 5.

The disclosure also provides a conductive three dimensional (3D) polymer network comprising one or more cores having a structure of Formula I(a):

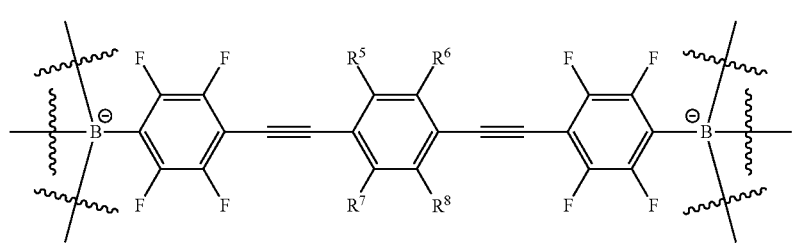

Formula I(a)

wherein, $R^5$-$R^8$ are independently selected from the group comprising H, D, optionally substituted FG, optionally substituted alkyl, optionally substituted heteroalkyl, optionally substituted alkenyl, optionally substituted heteroalkenyl, optionally substituted alkynyl, optionally substituted heteroalkynyl, optionally substituted cycloalkyl, optionally substituted cycloalkenyl, optionally substituted aryl, optionally substituted heterocycle, optionally substituted mixed ring system, wherein one or more adjacent R groups can be linked together to form one or more optionally substituted rings selected from the group comprising cycloalkyl, cycloalkenyl, heterocycle, aryl, and mixed ring system. In one embodiment, $R^5$-$R^8$ are independently selected from H, D, F, hydroxyl, amino, and alkoxy. In another embodiment, $R^5$-$R^8$ are H. In yet another embodiment of any of the foregoing, the polymer network has a diamondoid topology. In yet a further embodiment of any of the foregoing, the polymer network has dense interpenetration of a plurality of individual polymer networks. In still a further embodiment of any of the foregoing, the polymer network is non-porous. In a further embodiment of any of the foregoing, the polymer network was polymerized by using dimethyl sulfoxide or dimethyl formamide. In still further embodiments of any of the foregoing, the polymer network is charged with lithium ions by soaking the polymer network in a methanolic lithium hydroxide solution. In yet a further embodiment, the polymer network was processed by immersing the polymer network in one or more of the following solvent mixtures: deionized water, methanol, 1:1 methanol:tetrahydrofuran, and tetrahydrofuran. In another embodiment of any of the foregoing, the polymer network was dried by heating at 100° C. in vacuo (<0.1 torr) for 16 hours. In yet another embodiment of the foregoing, the 3D polymer network is loaded with a propylene carbonate solvent. In still another embodiment of any of the foregoing, the 3D polymer network conducts lithium ions. In one embodiment, the 3D polymer network has lithium ion conductivity of at least $2.5 \times 10^{-4}$ S/cm at ambient temperature. In another embodiment of any of the foregoing, the 3D polymer network cannot be penetrated by lithium dendrites.

The disclosure also provides a battery comprising the conductive 3D polymer network of any of the foregoing embodiments. In one embodiment, the battery is a lithium ion battery.

The details of one or more embodiments of the disclosure are set forth in the accompanying drawings and the description below. Other features, objects, and advantages will be apparent from the description and drawings, and from the claims.

DESCRIPTION OF DRAWINGS

FIG. 1 provides diagrams of the operation of current lithium electrolytes. Top panel, operation of a battery cell under ideal conditions, where only lithium cations are transferred to the anode with no interference from $PF_6$ anions. Middle panel, actual operation of a battery cell where $PF_6$ anions and lithium cations are negatively interacting so as to reduce the amount of lithium cations coming into contact with the anode. Bottom panel, a critical failure mechanism where a short circuit results from the cathode and anode are coming into direct contact with each other through a lithium dendrite bridge.

FIG. 2A-B provides two approaches for transmitting ions using polymers. (A) Ions are transmitted by coming into contact with neutral or anionic ligands that have been attached to the surface of a linear polymer. (B) Ions are transmitted by coming into contact with anions incorporated throughout the substructure of a 3D polymer network.

FIG. 5 provides for processing of the polymers to form macroscopic aggregates. Single particles, form initial aggregates during polymerization that have solvent dependent morphologies, which can be further processed to form macroscopic aggregates.

FIG. 6A-B presents scanning electron micrograph (SEM) images which demonstrate that the size and packing density of the particles comprising the macroscopic aggregates are influenced by the choice of solvent system and processing conditions. For (A) and (B), the polymer networks comprise linking moieties of FIG. 3, but nonfluorinated. (A) SEM image of aggregates formed using the polymerization solvent, dimethyl sulfoxide (DMSO). (B) SEM image of aggregates that formed using the polymerization solvent dimethylformamide (DMF). As can be seen by the SEM images, the choice of solvent influenced the size of particles formed and the resulting packing density.

FIG. 7 demonstrates that the diamondoid topology of the polymer networks allows for dense interpenetration of individual networks.

FIG. 8A-C presents conductivity measurements of polymer networks based on a diamondoid topology. (A) Structure of the polymer network. (B) Ions that were exchanged by NMR. (C) Impedance graph used to determine the conductivity of the polymer networks. The first polymer networks of (A) were found to have a conductivity of $5 \times 10^{-6}$ S·cm$^{-1}$ and activation energy of 0.38 eV.

FIG. 11A-B show (A) a synthetic approach to perfluorinated polymer 15 and (B) variable-temperature AC impedance spectra taken from 300 K to 373 K in 5 K intervals from 303 K on.

FIG. 12A-B shows (A) a synthetic approach to porous polymer 17 and (B) variable-temperature AC impedance spectra taken from 300 K to 373 K in 5 K intervals from 303 K on.

DETAILED DESCRIPTION

Figure 3:
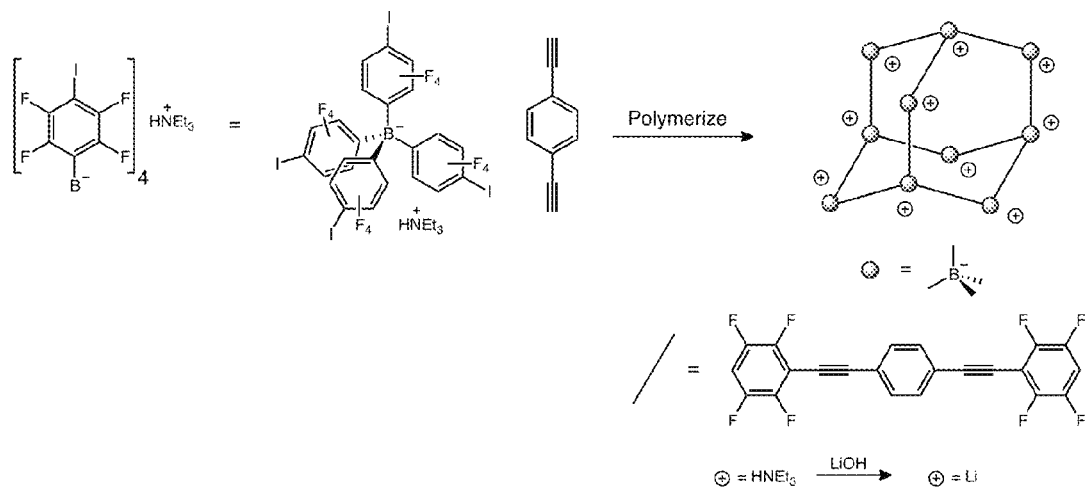
FIG. 3 provides a generalized scheme to make single ion polymer network conductors. Triethylammonium tetrakis(4-iodotetrafluorophenyl)borate is coupled with 1,4-diethynyl-benzene under Sonogashira reaction conditions to form a polymer network. Substituted ammonium ions can then be exchanged with lithium ions by adding lithium hydroxide.

As used herein and in the appended claims, the singular forms "a," "and," and "the" include plural referents unless the context clearly dictates otherwise. Thus, for example, reference to "a linking moiety" includes a plurality of such linking moieties and reference to "lithium-ion batteries" includes reference to one or more lithium-ion batteries and equivalents thereof known to those skilled in the art, and so forth.

Unless defined otherwise, all technical and scientific terms used herein have the same meaning as commonly understood to one of ordinary skill in the art to which this disclosure belongs. Although any methods and reagents similar or equivalent to those described herein can be used in the disclosed methods and compositions, the exemplary methods and materials are now described.

Also, the use of "or" means "and/or" unless stated otherwise. Similarly, "comprise," "comprises," "comprising" "include," "includes," and "including" are interchangeable and not intended to be limiting.

It is to be further understood that where descriptions of various embodiments use the term "comprising," those skilled in the art would understand that in some specific instances, an embodiment can be alternatively described using language "consisting essentially of" or "consisting of."

All publications mentioned herein are incorporated herein by reference in full for the purpose of describing and disclosing the methodologies, which are described in the publications, which might be used in connection with the description herein. However, with respect to any similar or identical terms found in both the incorporated publications or references and those expressly put forth or defined in this application, then those terms definitions or meanings expressly put forth in this application shall control in all respects.

As used herein, a "core" refers to a repeating unit or units found in a polymer network. A polymer network can comprise a homogenous repeating core, a heterogeneous repeating core or a combination of homogenous and heterogeneous cores. A core comprises one or more boron anions and one or more linking moieties. Various cores are depicted as structures throughout the disclosure as Formulas. Counter ions, such as substituted ammonium ions or lithium ions, have been omitted for clarity, but it should be understood that cores include associated counter ions. Therefore, a person of skill in the art should assume that the boron anions are capable of associating with counter ions, or have associated with the counter ions, even though they are not visually depicted as such in the Formulas.

The term "functional group" or "FG" refers to specific groups of atoms within molecules that are responsible for the characteristic chemical reactions of those molecules. While the same functional group will undergo the same or similar chemical reaction(s) regardless of the size of the molecule it is a part of, its relative reactivity can be modified by nearby functional groups. The atoms of functional groups are linked to each other and to the rest of the molecule by covalent bonds. Examples of FGs that can be used in this disclosure, include, but are not limited to, substituted or unsubstituted alkyls, substituted or unsubstituted alkenyls, substituted or unsubstituted alkynyls, substituted or unsubstituted aryls, substituted or unsubstituted hetero-alkyls, substituted or unsubstituted hetero-alkenyls, substituted or unsubstituted hetero-alkynyls, substituted or unsubstituted cycloalkyls, substituted or unsubstituted cycloalkenyls, substituted or unsubstituted hetero-aryls, substituted or unsubstituted heterocycles, halos, hydroxyls, anhydrides, carbonyls, carboxyls, carbonates, carboxylates, aldehydes, haloformyls, esters, hydroperoxy, peroxy, ethers, orthoesters, carboxamides, amines, imines, imides, azides, azos, cyanates, isocyanates, nitrates, nitriles, isonitriles, nitrosos, nitros, nitrosooxy, pyridyls, sulfhydryls, sulfides, disulfides, sulfinyls, sulfos, thiocyanates, isothiocyanates, carbonothioyls, phosphinos, phosphonos, phosphates, $Si(OH)_3$, $Ge(OH)_3$, $Sn(OH)_3$, $Si(SH)_4$, $Ge(SH)_4$, $AsO_3H$, $AsO_4H$, $P(SH)_3$, $As(SH)_3$, $SO_3H$, $Si(OH)_3$, $Ge(OH)_3$, $Sn(OH)_3$, $Si(SH)_4$, $Ge(SH)_4$, $Sn(SH)_4$, $AsO_3H$, $AsO_4H$, $P(SH)_3$, and $As(SH)_3$.

The term "hetero-" when used as a prefix, such as, hetero-alkyl, hetero-alkenyl, hetero-alkynyl, or hetero-hydrocarbon, for the purpose of this disclosure refers to the specified hydrocarbon having one or more carbon atoms replaced by non-carbon atoms as part of the parent chain. Examples of such non-carbon atoms include, but are not limited to, N, O, S, Si, Al, B, and P. If there is more than one non-carbon atom in the hetero-based parent chain then this atom may be the same element or may be a combination of different elements, such as N and O.

The term "mixed ring system" refers to optionally substituted ring structures that contain at least two rings, and wherein the rings are joined together by linking, fusing, or a combination thereof. A mixed ring system comprises a combination of different ring types, including cycloalkyl, cycloalkenyl, aryl, and heterocycle.

Lithium-ion batteries have become a ubiquitous technology for personal electronics and electric/hybrid vehicles. Numerous research efforts are being directed at improving each of the three main components of the battery system: the anode, the cathode, and the electrolyte. Currently, commercially available lithium ion batteries rely on simple lithium salts ($LiBF_4$ and $LiPF_6$) dissolved in high dielectric organic solvent mixtures, usually based on carbonates (e.g., propylene carbonate, dimethyl carbonate, etc.) and/or gylmes (e.g., diglyme, trigylme, etc.). Although such technology has been successfully commercialized, next-generation battery targets, such as those involving pure lithium metal anodes, or lithium air batteries, will require improved electrolytes.

Commercial devices rely on the use of organic electrolyte solutions, with simple non-coordinating lithium salts (e.g. $LiPF_6$) dissolved in highly polar and coordinating solvents such as propylene carbonate. Current electrolytes have three main features limiting their future application in advanced batteries. First, the use of a dissolved lithium salt (e.g., $LiPF_6$) results in a solution that has both cations and anions that are free to move through the electrolyte (e.g., see FIG. 1, middle panel). During operation, anions aggregate at the anode, creating a concentration polarization that negatively affects performance. Additionally, simple anions such as $PF_6^-$ will slowly decompose at the anode, forming inorganic products such as LiF and $Li_3P$. An ideal electrolyte would allow for lithium cations to move freely, but would have immobile anions (e.g., see FIG. 1, top panel); such materials are typically referred to as 'single-ion conductors'.

The use of these solutions present a number of safety and performance concerns. The inherent flammability of the organic solvent, coupled with its lack of mechanical resistance, makes device short circuits possible, either due to lithium dendrite growth during repeated charge/discharge cycles, or due to physical trauma.

One of the main technical challenges in producing lithium batteries that feature pure lithium metal anodes is the formation of lithium dendrites during battery charge/discharge cycles. These dendrites are small filamentous projections of lithium metal that grow off of the anode during cycling. If these dendrites cross the electrolyte, and make contact with the cathode, a short circuit results (e.g., see FIG. 1, bottom panel). The immediate flow of electrons from the anode to cathode is accompanied by a tremendous release of heat, and a fire often results. An ideal electrolyte would be mechanically resistant, and prevent the growth of dendrites across the battery. A simple lithium salt solution, as is currently used, does not have the ability to prevent dendrite growth.

Finally, a clear benefit is obtained by reducing the amount of organic solvent in lithium batteries. Often, the initial stages of a battery failure are accompanied by the release of heat, which is sufficient to ignite the flammable organic solvent found in the electrolyte. If such ignition sources could be removed, the safety profile of these technologies would be significantly improved.

Numerous avenues of investigation are being pursued to address these limitations, with the goal of eventual incorporation in lithium metal cells. Anchoring of the counterions into a polymeric structure, which renders them immobile, yields what is termed a 'single-ion' conducting electrolyte. Ideally, such a polymer structure would also provide mechanical resistance to lithium dendrites and physical compaction, helping to prevent short-circuiting and the battery fires that would follow immediately after.

The innovative single ion polymer network conductors disclosed herein have many advantages over other ion conducting materials. First, by having borate anions being embedded in the polymer network, only the lithium ions are mobile. Therefore, the polymer networks conduct only single-ions. Second, the three-dimensional connectivity of the polymer network affords significant mechanical strength in comparison to linear polymers (e.g., see FIG. 2A-B). Third, although some amount of organic solvent is required, it is used in much smaller amounts than commonly used for commercial batteries.

The disclosure provides single ion polymer network conductors that are capable of conducting lithium ions in an efficient and safe manner. These polymer networks are three dimensional ("3D") and are comprised of substituted aryl borate building blocks linked together with linear organic linkers. The polymer networks are synthesized by coupling the substituted aryl borate monomers with linear organic linkers using common organic polymerization techniques (e.g., Sonogashira reaction) (e.g., see FIG. 3). The polymer is synthesized with cations (e.g., triethylammonium cations) that can be easily exchanged by soaking the synthesized framework with a methanolic lithium hydroxide solution (e.g., see FIG. 3). Lithium ion conduction of the polymer networks results after soaking in propylene carbonate solvent, followed by filtration to remove free solvent.

In a particular embodiment, a polymer network of the disclosure comprises one or more cores having the structure of Formula I:

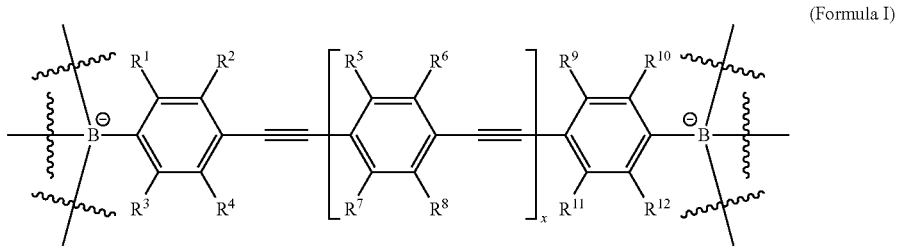

(Formula I)

wherein, $R^1$-$R^{12}$ are independently selected from the group comprising H, D, optionally substituted FG, optionally substituted alkyl, optionally substituted heteroalkyl, optionally substituted alkenyl, optionally substituted heteroalkenyl, optionally substituted alkynyl, optionally substituted heteroalkynyl, optionally substituted cycloalkyl, optionally substituted cycloalkenyl, optionally substituted aryl, optionally substituted heterocycle, optionally substituted mixed ring system, wherein one or more adjacent R groups can be linked together to form one or more optionally substituted rings selected from the group comprising cycloalkyl, cycloalkenyl, heterocycle, aryl, and mixed ring system; and X is an integer from 0 to 5.

In another embodiment, a polymer network of the disclosure comprises one or more cores having the structure of Formula I(a):

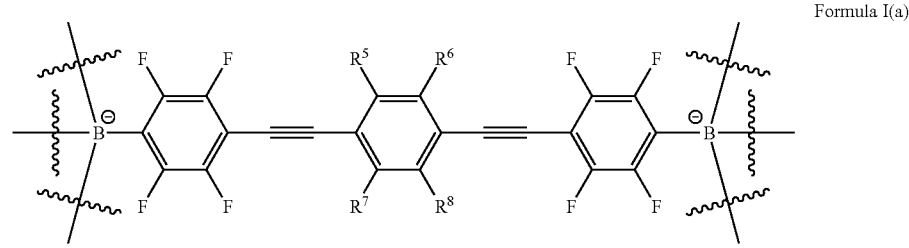

Formula I(a)

wherein, $R^5$-$R^8$ are independently selected from the group comprising H, D, optionally substituted FG, optionally substituted alkyl, optionally substituted heteroalkyl, optionally substituted alkenyl, optionally substituted heteroalkenyl, optionally substituted alkynyl, optionally substituted heteroalkynyl, optionally substituted cycloalkyl, optionally substituted cycloalkenyl, optionally substituted aryl, optionally substituted heterocycle, optionally substituted mixed ring system, wherein one or more adjacent R groups can be linked together to form one or more optionally substituted rings selected from the group comprising cycloalkyl, cycloalkenyl, heterocycle, aryl, and mixed ring system.

In yet a further embodiment, a polymer network of the disclosure comprises one or more cores having the structure of Formula I(a):

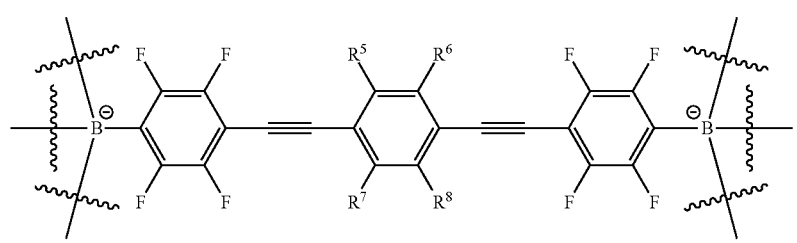

Formula I(a)

wherein, $R^5$-$R^8$ are independently selected from H, D, F, hydroxyl, amino, and alkoxy.

In a certain embodiment, a polymer network of disclosure comprises one or more cores having the structure of:

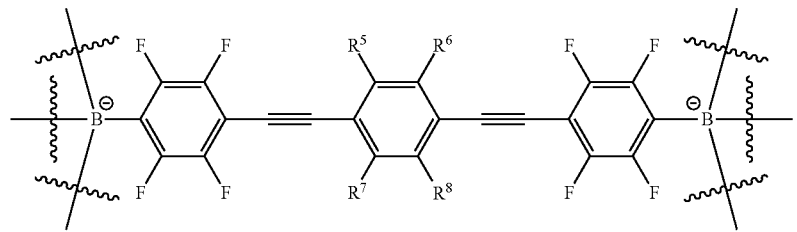

Figure 4:
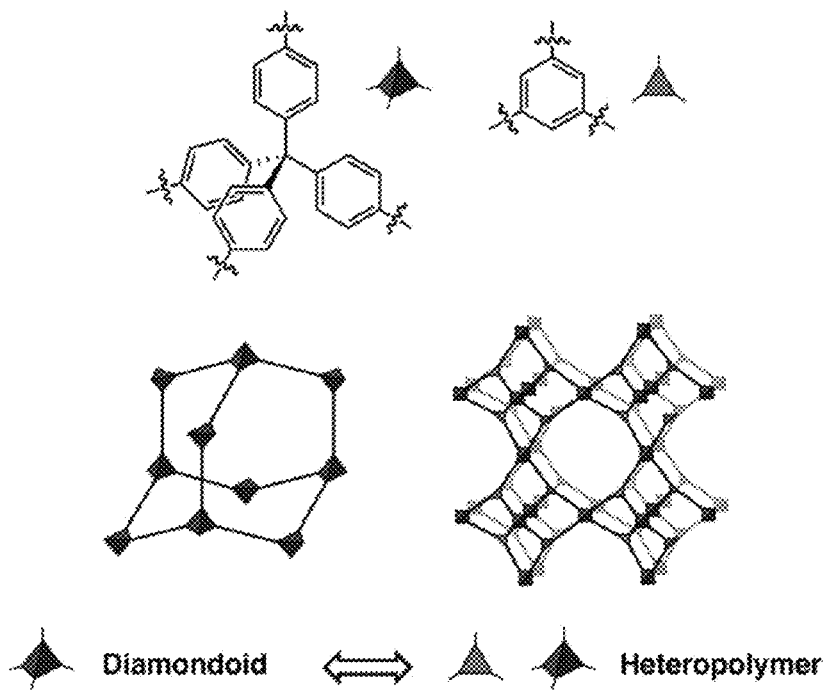
FIG. 4 demonstrates that the polymer networks have a diamondoid topology. The choice of linker geometry can be used to favor a particular topology.

In a particular embodiment, the polymer networks disclosed herein have a diamondoid topology (e.g., see FIG. 4). This topology allows for dense interpenetration of individual networks (e.g., see FIG. 7). Unlike other materials, such as microporous polymer networks utilizing 1,3,5 tri-substituted benzene linking moieties (e.g., see FIG. 4), the polymer networks disclosed herein can be porous or nonporous. In certain embodiment, the polymer networks are non-porous. One of the advantages of the polymer network being non-porous is that distance between nearest boron neighbor atoms is small which allows for efficient transferring of lithium ions between sites. By contrast, materials which are porous such as covalent organic frameworks (COFs) have significant gaps between anionic sites which impede the efficient conduction of lithium ions.

Individual particles of the polymer networks are polymerized using a polymerizing solvent, such as DMSO or DMF, to form initial aggregates (e.g., see FIG. 5). These aggregates are further processed by rinsing with solvents and drying conditions to form macroscopic aggregates (e.g., see FIG. 5). The conductivity for the polymer networks disclosed herein is influenced by the polymerization and processing conditions. Accordingly, the conductivity properties of the networks can be tuned to meet specific requirements for particular applications. For example, for a polymer network of FIG. 3 where the fluorine atoms have been replaced by hydrogen atoms, the choice of polymerization solvent (DMSO vs DMF) resulted in greater than 1,000× difference in lithium ion conduction. This difference in conductivity is likely due to particle packing density, as suggested by the SEM images shown in FIG. 6A-B. As shown in FIG. 6A, the agglomerate is comprised of very small particles, resulting in a smooth texture. The lithium ions can move easily between these particles, as there are no large gaps. As shown in FIG. 6B, although the agglomerate is comprised of the same organic and linking moieties as in FIG. 6A, the agglomerate has a less efficient packing density, resulting in conductivity that >1,000×lower than agglomerate of FIG. 6A. Not only does the packing density of individual particles in agglomerates affect conductivity of the ions, but the packing of the agglomerates into macroscopic solids also affects conductivity. Up to 4×differences in conductivity have been seen for fluorinated materials based upon the drying conditions used after polymerization.

As shown in FIG. 7, polymer networks with a diamondoid topology allows for integration by multiple single polymers to form dense solid aggregates. For the integrated polymer networks (e.g., see FIG. 8B), when the substituted ammonium ions were exchanged with lithium ions (e.g., see FIG. 8B), the networks were found to conduct single lithium ions in an efficient manner (e.g., see FIG. 8A-C). It was further found by using alternate linking moieties (e.g., those substituted with fluorine atoms) the conductivity of the polymer networks could be improved.

In a particular embodiment, the conductive 3D polymer networks disclosed herein can be used in a variety of application where the selective transfer of single ions would be advantageous, such as for use in batteries, nuclear separations, or environmental remediation. In a certain embodiment, a lithium ion battery comprises a polymer network disclosed herein. Examples of lithium ion batteries that can be used with the polymer networks disclosed herein include, but are not limited to, 18650(4/3AF), 18500, 14500(AA), 14430(4/5AA) 10440(AAA), 14650 (7/5AA), 17500(A), 26650 (Long C), 26650M, 38120P(M), 40160S(Long M), RCR123A, CR123A-Dummy, 1-2C rate, High Power, 2032 button cell, and 2450 button cell.

The following examples are intended to illustrate but not limit the disclosure. While they are typical of those that might be used, other procedures known to those skilled in the art may alternatively be used.

EXAMPLES

Synthesis of polymer networks: Triethylammonium tetrakis(4-iodotetrafluorophenyl)borate (606 mg, 0.500 mmol), 1,4-diethynylbenzene (127 mg, 1.01 mmol), copper iodide (19 mg, 0.10 mmol) and chloro(2-dicyclohexylphosphino-2',4',6'-triisopropyl-1,1'-biphenyl) [2-(2'-amino-1,1'-biphenyl)]palladium(II) (20 mg, 0.025 mmol) were charged in an oven dried 40 mL vial that was purged with flowing nitrogen for 30 minutes. Next, degassed dimethyl sulfoxide (10 mL) and freshly distilled triethylamine (835 μL) were added through a septum. The syringe holes in the septum were sealed with melted Parafilm®. The reaction mixture was heated to 60° C. and maintained at this temperature with stirring for 72 hours. The solid black gel that resulted after polymerization was scooped onto a filter paper, and was washed with copious amounts of acetone (50 mL per cycle, one cycle every ten minutes, ten total cycles). The resulting powder was allowed to briefly air dry, and was then moved to a fresh 40 mL vial. Lithium hydroxide (75 mg) was added, along with anhydrous methanol (24 mL). The vial was heated at 60° C. under nitrogen for 12 hours. The methanol was removed via syringe, and fresh lithium hydroxide (50 mg) and anhydrous methanol (24 mL) were added. The suspension was then heated at 60° C. for another 12 hours. After removing the methanol by syringe, a final portion of lithium hydroxide (25 mg) and anhydrous methanol (24 mL) were added. The suspension was heated to 60° C. for a final 12 hours. After recovering the material by filtration, it was subjected to 24 mL of each of the following solvent mixtures, for two hours in each case: deionized water•methanol•methanol•1:1 methanol:tetrahydrofuran•tetrahydrofuran•tetrahydrofuran. All of these organic solvents were anhydrous, and were removed by syringe before the addition of a subsequent volume. After a final filtration and air drying, the resulting solid was further dried by heating to 100° C. under high vacuum (<0.1 torr) for 16 hours.

Conductivity Measurements: A sample was prepared to measure conductivity as follows: A small portion of the above described material (50 mg) was soaked in anhydrous propylene carbonate (4 mL) for 72 hours in a nitrogen filled glove bag. The solvent-loaded sample was then filtered under nitrogen atmosphere in the same glove bag. The material was then transferred under inert atmosphere into a glove box containing a potentiostat. A Garolite spacer (125 μm thick) with a small circle removed (3.88 mm diameter) was taped onto a stainless steel washer. The cavity in the Garolite spacer was filled with the conductive material, and was compressed with the aid of a hand press. The resulting stainless steel disc/washer/conductive material sample was loaded into a brass cell, where a stainless steel plug could be pressed onto the top face of the sample. The resulting apparatus could be attached at two points to the potentiostat, and electrical impedance spectroscopy measurements delivered a lithium ion conductivity value of $\sigma=2.5\times10^{-4}$ S/cm.

Figure 9:
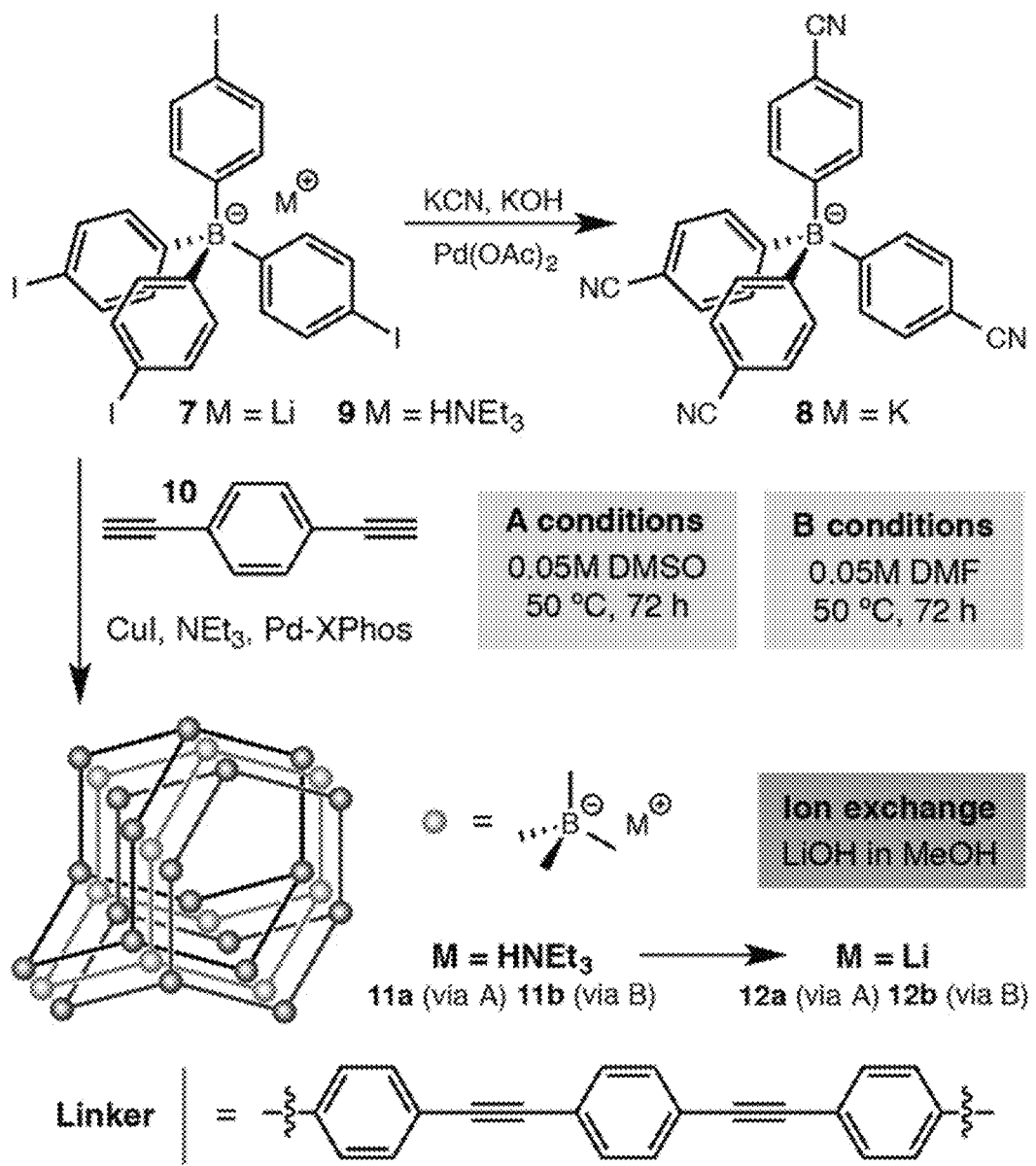
FIG. 9 depicts a synthetic approach to the first generation solid lithium electrolyte based on a (proteo)phenylborate monomer.
Figure 10:
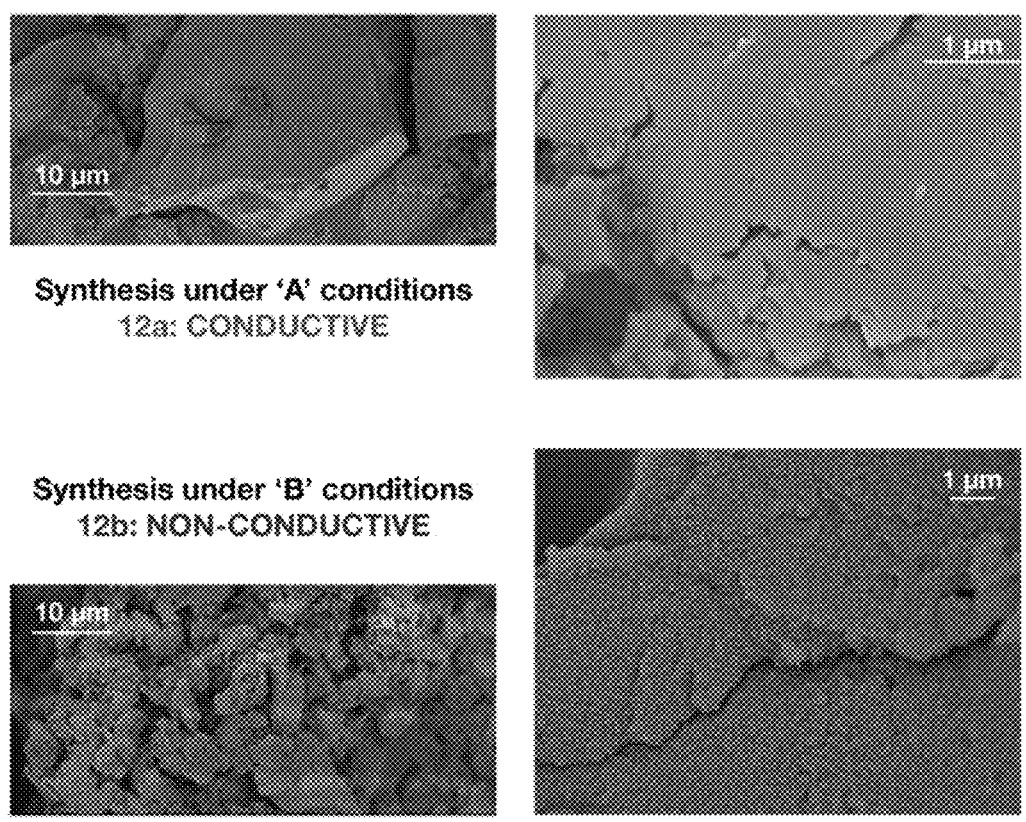
FIG. 10 show scanning electron micrographs of borate polymers produced in DMSO (12a Top) and DMF (12b Bottom).

At the outset only a singular example of a fourfold cross coupling reaction occurring at a tetraarylborate center existed (i.e. 7→8, FIG. 9). Polymerization reactions of both lithium tetraarylborate 7, as well as its triethylammonium analog 9 were investigated. The use of Buchwald's second generation XPhos precatalyst in Sonogashira conditions allowed for productive polymerization with a linear bis-alkyne (10). The rigorously insoluble polymers produced had elemental analyses and infrared spectra consistent with the desired structures. Surprisingly, and in sharp contrast to earlier work with neutral diamondoid frameworks, these materials were non-porous, as determined by nitrogen gas uptake at 77 K. Although the framework displays no porosity, the triethylammonium cations initially present when using monomer 8 could be easily exchanged with lithium hydroxide. Potentially, one could also use other basic metal salts (e.g. NaOH, KOH) to generate a family of solid electrolytes from a single parent polymer, because of this experiments were focused on polymers initially derived from triethylammonium borate building blocks. Polymers generated from DMSO solution (11a) did show a moderate ionic conductivity after ion exchange (12a), washing with low boiling solvents (MeOH, THF), drying in vacuo, and readsorption of small quantities of propylene carbonate. During the initial attempts to improve the conductivity of this material by optimization of the synthetic procedure, a striking result was obtained: while polymers produced in DMF solution (i.e. 11b and 12b) presented elemental analysis and infrared spectra indistinguishable from polymers produced in DMSO, they were universally non-conductive ($<10^{-8}$ S/cm). SEM images of these materials did provide noteworthy contrast (FIG. 10). Conductive materials synthesized in DMSO were smooth, as compared with materials generated in DMF.

Figure 11A:
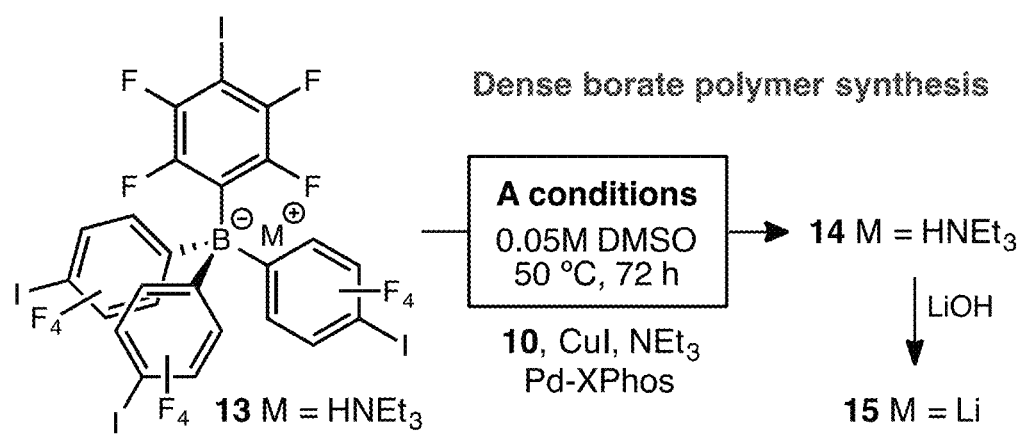
Figure 14:
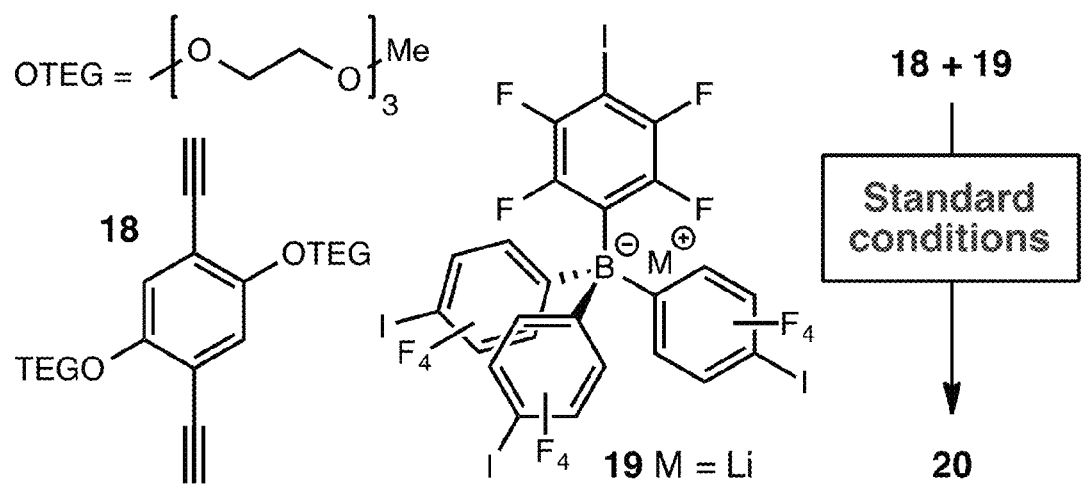
FIG. 14 shows an alternative synthetic approach for the production of tri(ethylene glycol) substituted polymer 20.

As attempts to improve the conductivity of these materials simply through optimization of the synthetic procedure had failed, experiments were performed to increase the conductivity of these polymers by weakening the lithium•borate interaction. As has been well demonstrated in the context of organometallic chemistry, (per)fluorination of borate counterions can have this desired effect. Polymerization of perfluorinated arylborate monomer 13 under the standard conditions again resulted in the precipitation of a non-porous and rigorously insoluble polymer (FIG. 11a, 14). In this case, the lack of porosity is even more surprising. Again, the use of triethylammonium borate 13 led to a polymer that could potentially serve as the parent material for a family of solid electrolytes; ion exchange with a suitably basic metal hydroxide (i.e. LiOH) was trivial.

Figure 11B:
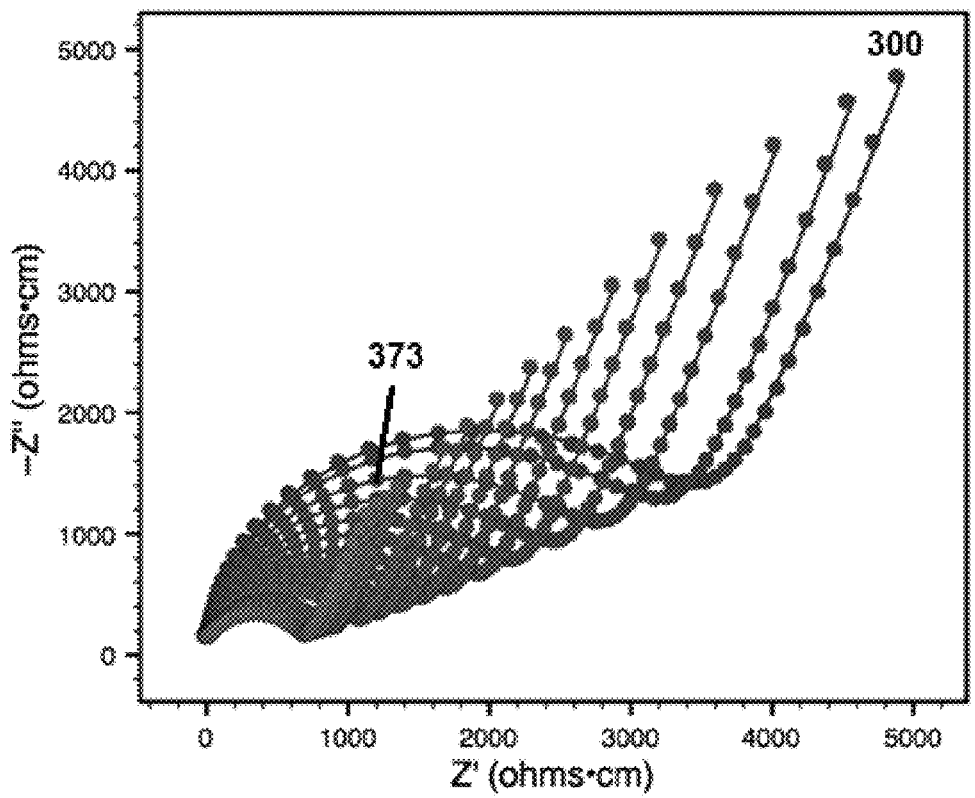

This chemical change resulted in a polymer with a significantly increased ionic conductivity: $2.5\times10^{-4}$ S/cm, a value that had entered the realm of what is necessary for incorporation into an actual cell (FIG. 11b). Furthermore, with the perfluorinated borate node identified as a sufficient building block for a solid electrolyte, attention was directed to varying network density, as well as the chemistry of the linear bis-alkyne linker.

Figure 12A:
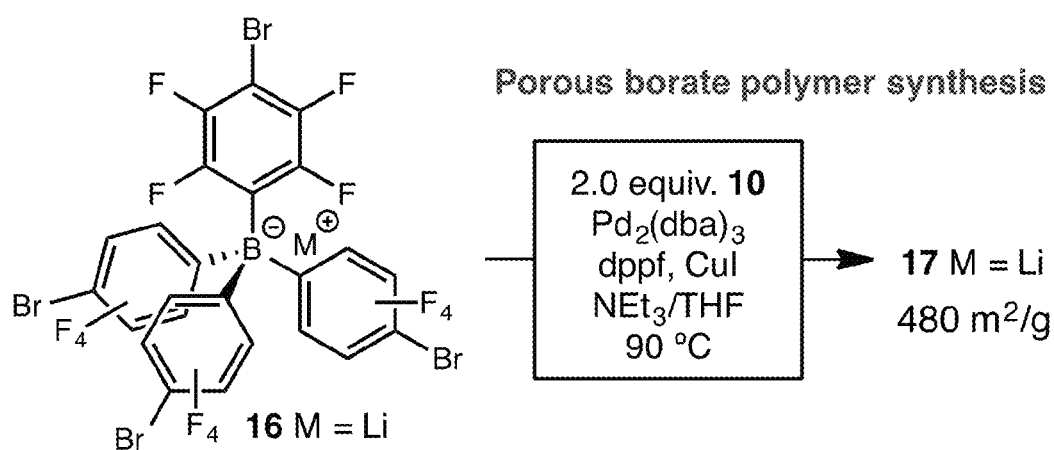
Figure 12B:
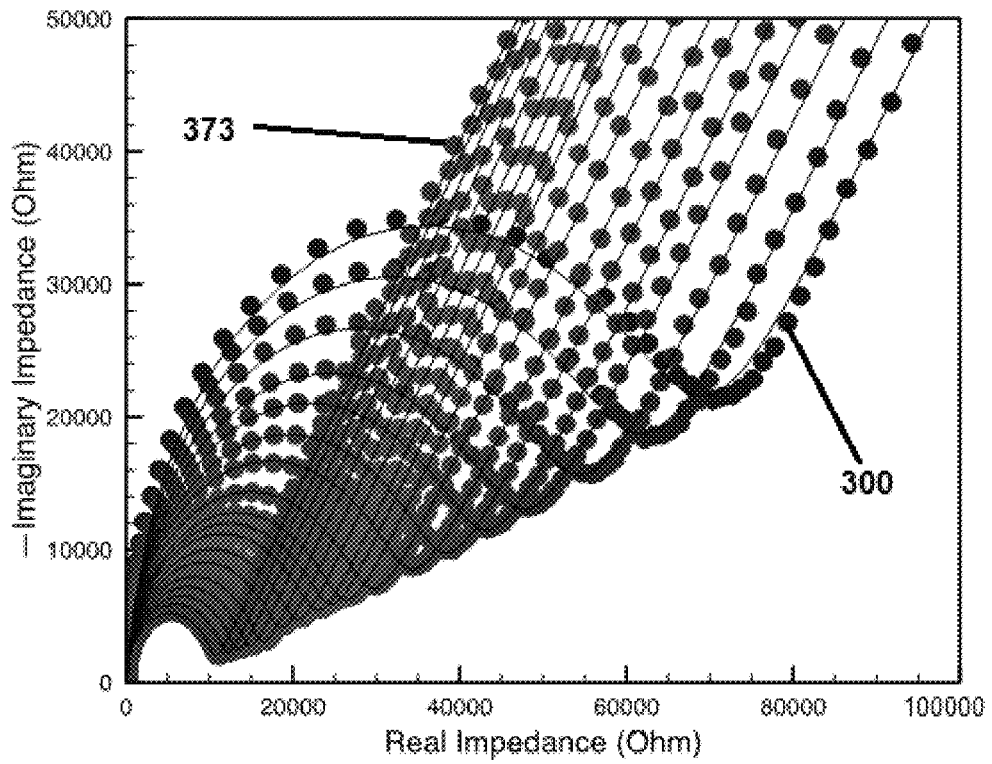
Figure 13:
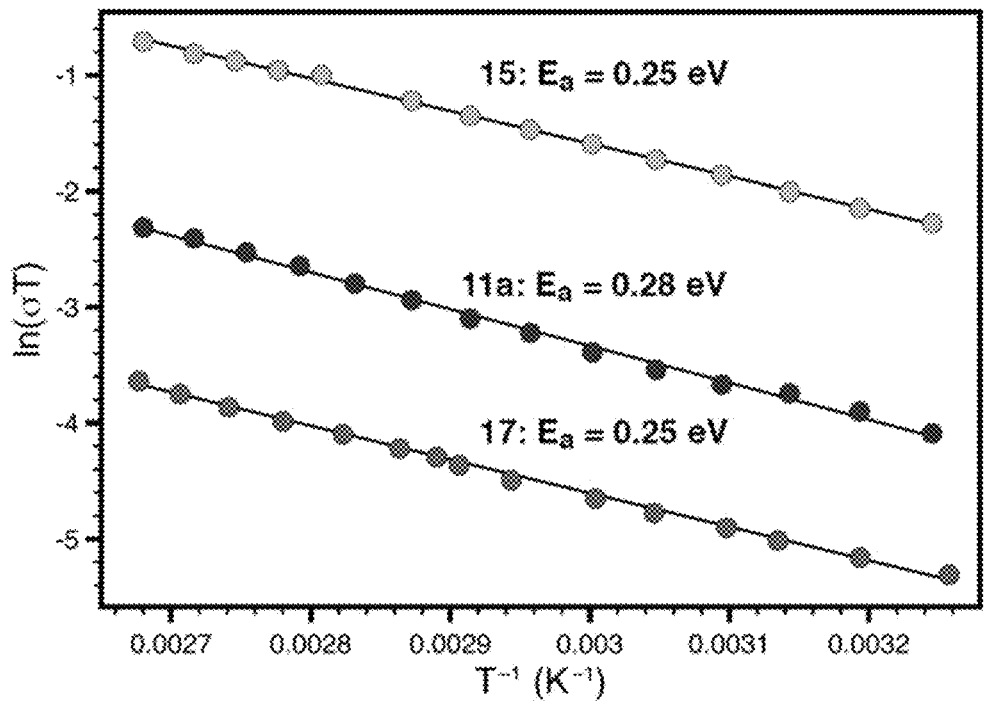
FIG. 13 shows a comparison of activation energies for non-porous polymers 11a and 15, and porous polymer 17.

Synthetic conditions utilizing the corresponding brominated monomer 16, resulted in the production of an anionic framework (17) that, conversely, did display permanent porosity (FIG. 12). The synthetic conditions, rather than simply topology, provided for the lack of permanent porosity in polymers 12 and 15. After soaking with excess LiPF6 to exchange any transition metal or organic cation impurities, and subsequent washing to remove excess lithium, BET surfaces areas on the order of 480 m$^2$/g were observed. In a qualitative sense, overall particle morphology seemed to be a useful predictor of bulk conductivity across a pressed solid pellet. The relatively rough porous materials generated proved to be over an order of magnitude less conductive that the non-porous analog 15 (1.4×10⁻⁵ S/cm vs 2.5×10⁻⁴ S/cm). Although fluorinated polymer 15 and its non-fluorinated analog 11a differ in terms of bulk conductivity by over an order of magnitude, they display roughly the same activation energy (FIG. 13).

Figure 15A:
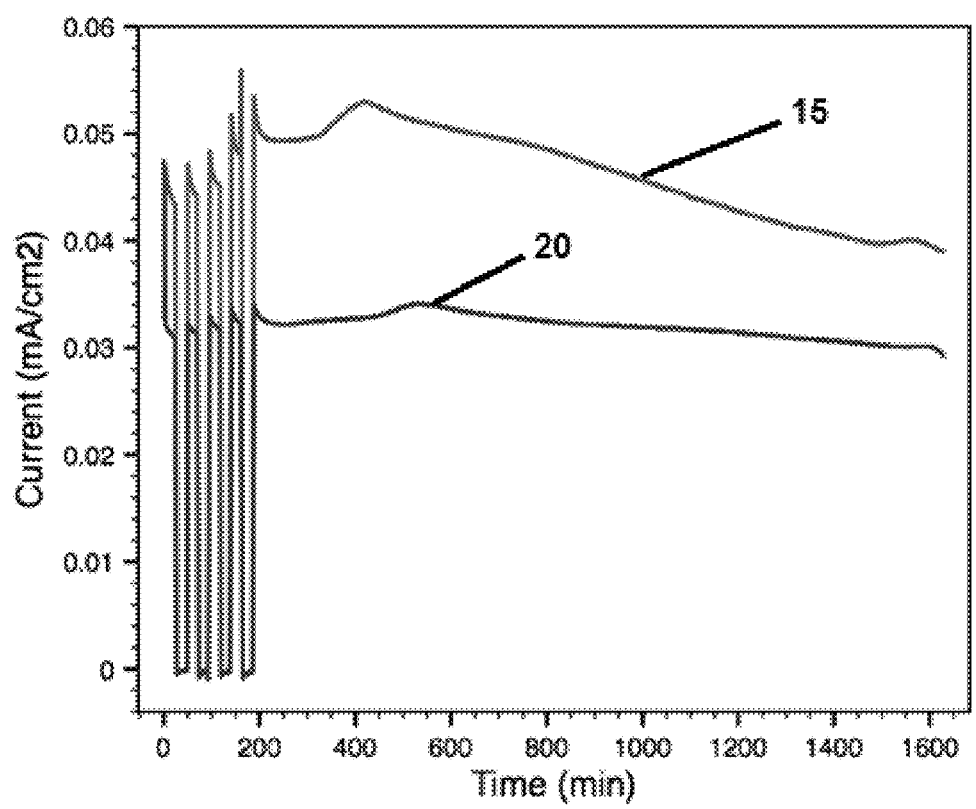
FIG. 15A-C shows (A) Current response from 300 mV applied potential to 15 and 20 in a symmetric lithium metal cell. (B-C) AC impedance spectra collected during 24-hour operation of Li(s)|electrolyte|Li(s) symmetric cells. (B): polymer 15. (C): polymer 20. Data represents impedance spectra taken without applied voltage; spectra taken with 300 mV applied voltage; and final spectrum taken after completion of the experiment.
Figure 15B:
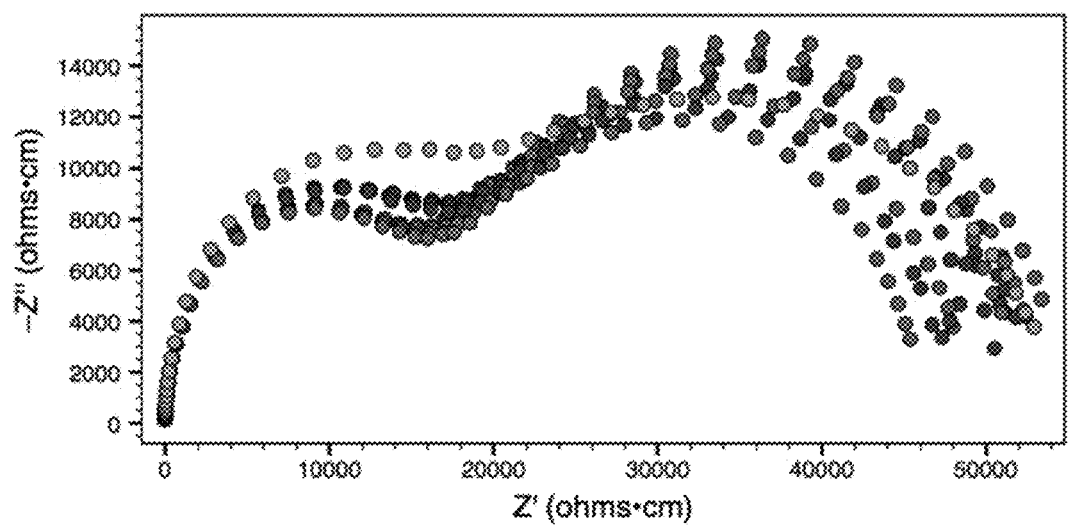
Figure 15C:
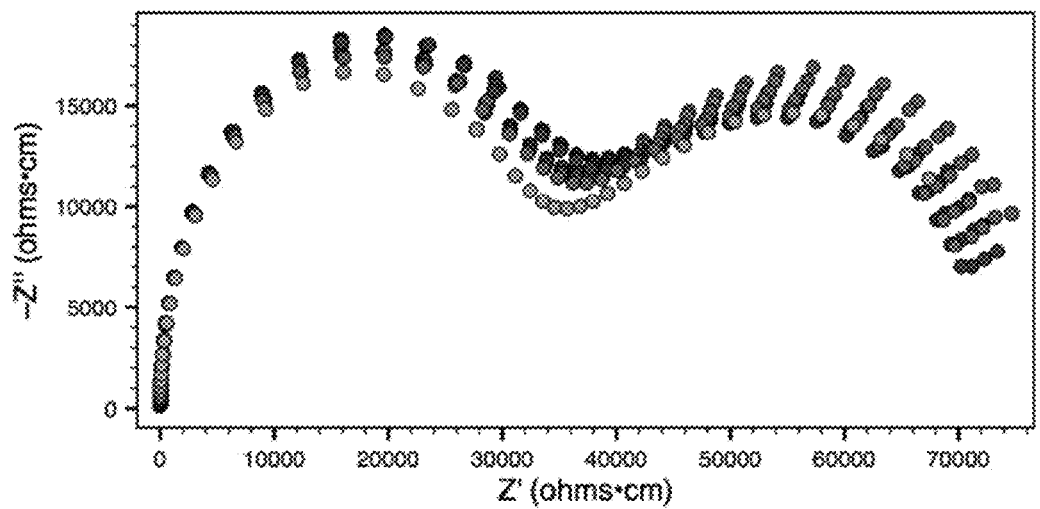

As has been demonstrated in the context of block copolymers, ethylene glycol domains can provide effective conduction pathways for lithium ion, potentially in the absence of any volatile organic electrolyte. As an initial chemical modification, tri(ethylene glycol) oligomers were tethered to the linear linker at the 2- and 5-positions (18, FIG. 14). The standard synthetic procedure using triethylammonium borate 13 yielded appropriate quantities of polymer, however, surprisingly no significant ion exchange occurred after exposure to lithium hydroxide. Fortunately, the glycol-containing material was generated by direct polymerization of lithium borate 19, which proved to be free of nitrogen-containing impurities (i.e. triethylammonium cations generated during Sonogashira polymerization). Although glycol-containing polymer 20 was not conductive in the dry state, it did yield important performance contrast with 15 when incorporated in symmetric Li(s)|borate polymer|Li(s) cells. Using 300 mV applied potential (versus open circuit), the polymers 15 and 20 were subjected to four 25-minute on/off cycles, followed by a 24-hour hold, as an initial assessment of both lithium transference number, and stability of lithium metal (FIG. 15A-C). Polymer 15 did display a higher ionic conductivity, and showed larger current in response to the applied voltage. However, 15 also displayed greater initial current decay during both the 25 minute pulses (indicating a lower transference number), and showed a measurable decrease during the course of the entire experiment (indicating lower stability to lithium metal). During the experiment, at the end of every 25 minute cycle, as well as at the end of the entire experiment, AC impedance spectra were collected, which support the supposition that polymer 20 has increased stability. While both materials displayed little or no change in the amount of interfacial impedance, tri(ethylene glycol) substituted polymer 20 actually displayed a slight increase in ionic conductivity—a sharp contrast to 15. The ability to make a meaningful impact on such material parameters through straightforward chemical substitution of one of the monomer units should provide a direct avenue to further improve material performance.

A number of embodiments have been described herein. Nevertheless, it will be understood that various modifications may be made without departing from the spirit and scope of this disclosure. Accordingly, other embodiments are within the scope of the following claims.

What is claimed is:

1. A conductive three dimensional (3D) polymer network comprising a plurality of cores having a structure of Formula I:

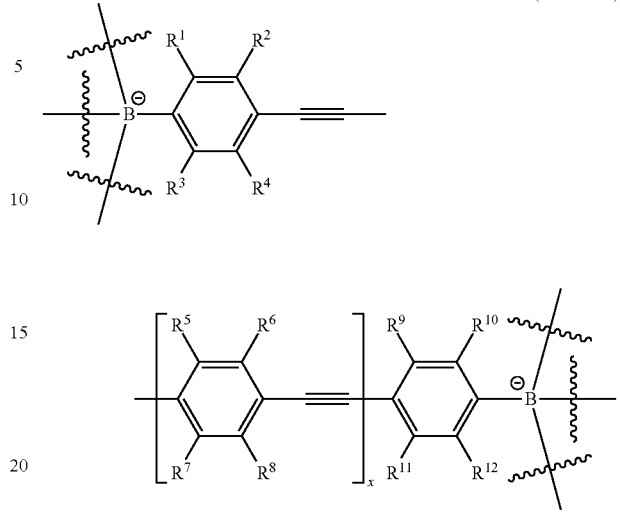

(Formula I)

wherein,

R¹-R¹² are independently selected from the group comprising H, D, optionally substituted FG, optionally substituted alkyl, optionally substituted heteroalkyl, optionally substituted alkenyl, optionally substituted heteroalkenyl, optionally substituted alkynyl, optionally substituted heteroalkynyl, optionally substituted cycloalkyl, optionally substituted cycloalkenyl, optionally substituted aryl, optionally substituted heterocycle, optionally substituted mixed ring system, wherein one or more adjacent R groups are linked together to form one or more optionally substituted rings selected from the group comprising cycloalkyl, cycloalkenyl, heterocycle, aryl, and mixed ring system; and X is an integer from 0 to 5.

2. The conductive 3D polymer network of claim 1 comprising a plurality of cores having a structure of Formula I(a):

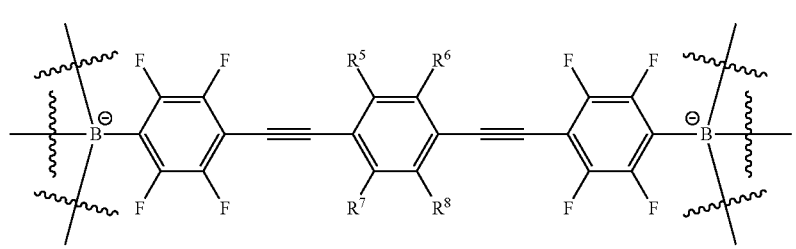

Formula I(a)

wherein,

R⁵-R⁸ are independently selected from the group comprising H, D, optionally substituted FG, optionally substituted alkyl, optionally substituted heteroalkyl, optionally substituted alkenyl, optionally substituted heteroalkenyl, optionally substituted alkynyl, optionally substituted heteroalkynyl, optionally substituted cycloalkyl, optionally substituted cycloalkenyl, optionally substituted aryl, optionally substituted heterocycle, optionally substituted mixed ring system, wherein one or more adjacent R groups are linked together to form one or more optionally substituted rings selected from the group comprising cycloalkyl, cycloalkenyl, heterocycle, aryl, and mixed ring system.

3. The conductive 3D polymer network of claim 1, wherein $R^5$-$R^8$ are independently selected from H, D, F, hydroxyl, amino, and alkoxy.

4. The conductive 3D polymer network of claim 3, wherein $R^5$-$R^8$ are H.

5. The conductive 3D polymer network of claim 1, wherein the polymer network has a diamondoid topology.

6. The conductive 3D polymer network of claim 1, wherein the polymer network has dense interpenetration of a plurality of individual polymer networks.

7. The conductive 3D polymer network of claim 1, wherein the polymer network is non-porous.

8. The conductive 3D polymer network of claim 1, wherein the polymer network was polymerized by using dimethyl sulfoxide or dimethyl formamide.

9. The conductive 3D polymer network of claim 1, wherein the polymer network is charged with lithium ions by soaking the polymer network in a methanolic lithium hydroxide solution.

10. The conductive 3D polymer network of claim 1, wherein the polymer network was processed by immersing the polymer network in one or more of the following solvent mixtures: deionized water, methanol, 1:1 methanol:tetrahydrofuran, and tetrahydrofuran.

11. The conductive 3D polymer network of claim 1, wherein the polymer network was dried by heating at 100° C. under high vacuum (<0.1 torr) for 16 hours.

12. The conductive 3D polymer network of claim 1, wherein the 3D polymer network is loaded with a propylene carbonate solvent.

13. The conductive 3D polymer network of claim 1, wherein the 3D polymer network conducts lithium ions.

14. The conductive 3D polymer network of claim 13, wherein the 3D polymer network has lithium ion conductivity of at least $2.5 \times 10^{-4}$ S/cm at ambient temperature.

15. The conductive 3D polymer network of claim 1, wherein the 3D polymer network cannot be penetrated by lithium dendrites.

16. A battery comprising the conductive 3D polymer network of claim 1.

17. The battery of claim 16, wherein the battery is a lithium ion battery.

* * * * *